United States Patent Office 3,330,829
Patented July 11, 1967

3,330,829
TRIAZINYL-SILOXANE AND HYDROLYSIS PRODUCTS THEREOF
Norman Geoffrey Creasey, Irvine, and James Alastair Crichton Watt, Fairlie, Scotland, assignors to Imperial Chemical Industries Limited, London, England, a corporation of Great Britain
No Drawing. Filed Aug. 21, 1964, Ser. No. 391,327
Claims priority, application Great Britain, Sept. 12, 1963, 36,008/63
6 Claims. (Cl. 260—249.5)

The present invention relates to new and useful N-containing compositions and more particularly to such compositions having an organosilicon moiety.

A wide variety of organosilicon compositions are known and are freely available. Many of these are widely used because of their many useful and advantageous properties. One of the more important uses is as a treatment medium to confer water-repellency on textiles. While the compositions used for such purposes in many cases give an adequate finish capable of giving reasonably satisfactory service, many of the finishes so obtained are not as permanent as is desirable, for example, when subjected to treatments such as dry cleaning and washing.

According to the present invention a new and useful organosilicon composition comprises one or more silanes or siloxanes having at least one group of the general formula

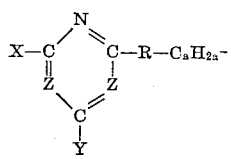

where R is a divalent N-containing heterocyclic radical which is joined to the azine radical through its heterocyclic nitrogen atom, Z is N, CH, CCl or CCN, X and Y, which may be the same or different, are Cl, Br, I, OR', NR'$_2$ (where R' is hydrogen, an alkyl group or an aryl group) and $a$ is a positive integer having a value not greater than 15, said group or groups being directly attached to a silicon atom.

While $a$ may be any positive integer not less than 15 it is in general preferred that it should have a value of from 1 to 6.

The remaining groups in the silanes of our invention may be alkyl groups such as methyl or ethyl groups, substituted alkyl groups such as chloromethyl or methoxyethyl groups, aryl groups such as phenyl or tolyl groups, substituted aryl groups such as chlorophenyl groups, alkaryl groups such as benzyl groups, alkenyl groups such as allyl or vinyl groups, hydroxy groups, hydrolysable groups such as methoxy, ethoxy, methoxyethoxy, allyloxy or phenoxy groups or a halogen such as chlorine or bromine.

In the siloxanes of our invention, which may be prepared inter alia, by hydrolysis and condensation from a hydrolysable silane of our invention the remaining groups may be alkyl, aryl, alkaryl, aralkyl or alkenyl groups. Suitable groups include, for example, methyl, ethyl, chloromethyl, methoxyethyl, vinyl, allyl, phenyl, chlorophenyl, tolyl, benzyl, methoxy, ethoxy, phenoxy, methoxyethoxy and allyloxy groups. Siloxanes containing methyl, phenyl or vinyl groups or a combination of two or more of these are in many cases preferred.

The group R may be any divalent N-containing heterocyclic group. Suitable groups include, for example, piperidyl, substituted piperidyl, pyrrolyl, pyrrolinyl, pyrrolidinyl, 1,2,3,4-tetrahydroquinolyl and 1,2,3,4-tetrahydroisoquinolyl groups. It is, however, in general preferred that R be a piperidyl or substituted piperidyl group.

In one method of preparing the products of our invention a suitable amine may be reacted with a diazine or triazine derivative. In this process a wide variety of amines may be used. The amine should, of course, contain at least one silicon atom having attached thereto through a methylene or polymethylene group an N-containing heterocyclic radical having at least one free N-H group, for example, such as piperidyl or substituted piperidyl radical. A wide variety of diazines and triazines may be reacted in the process to obtain the products of our invention. The diazine or triazine must contain at least one reactive CCl group. Suitable diazines include 2,4,6-trichloropyrimidine, 2,4,5,6-tetrachloropyrimidine, 2,4,6-trichloro-5-cyanopyrimidine and the like and suitable triazines include cyanuric chloride, 2,4-dichloro-6-methoxy-s-triazine, 2-chloro-4,6-dimethoxy - s - triazine and 2,4-dichloro-6-phenoxy - s - triazine and the like. The reaction may, if desired, be carried out in the presence of a suitable inert anhydrous solvent in which both reactants are soluble, for example, such as benzene, toluene, acetone, dioxane and the like. There should also be present a stoichiometric quantity of a hydrogen chloride acceptor, for example, such as ammonium carbonate, sodium carbonate or the like, to remove the hydrogen chloride produced in the reaction.

The hydrolysable silanes of our invention may be used to produce the siloxanes of our invention and for many of the purposes for which hydrolysable silanes are suitable, and the polysiloxanes may be used, inter alia for conferring water repellency on textiles thereby giving fabrics which show good wash fastness. The nonhydrolysable silanes may be used, for example, as modifiers for oils and greases and for surface treatment of metals or cellulosic materials.

Our invention is further illustrated by the following examples in which all parts and percentages are by weight.

*Example 1*

19.6 parts of β-(4-piperidyl)ethylmethyldiethoxysilane dissolved in 150 parts of benzene were added to 14.8 parts of cyanuric chloride dissolved in 250 parts of benzene at 20° C. 7.7 parts of ammonium carbonate were added and the mixture stirred vigorously at 20° C. for 3½ hours, by which time it had become red. The mixture was filtered and the solvent removed by distillation to give 30 parts of a dark red oil. This product was of use as a surface coating agent for metals.

*Example 2*

1 part of 1,3-bis-[β-(2-methyl-5-piperidyl)ethyl]tetramethyldisiloxane dissolved in 10 parts of benzene were added to 0.96 part of cyanuric chloride dissolved in 15 parts of benzene at 20° C. 0.5 part of ammonium carbonate was added and the mixture stirred vigorously for 3 hours at 20° C. The mixture was then filtered and the solvent removed by distillation to give 1.8 parts of a red oil which was shown to be the cyanuric chloride derivative of the original amine. This product was of value as a surface coating agent for metals.

*Example 3*

22.8 parts of 1,3-bis-[β-(2-methyl - 5 - pyridyl)ethyl] tetramethyldisiloxane dissolved in 100 parts of ethanol were added to 30 parts of 10 N-hydrochloric acid. 0.2 part of platinic oxide was then added to the solution and the whole vigorously agitated at 20° C. in an atmosphere of hydrogen until the theoretical quantity had been absorbed. The catalyst was removed by filtration, the solvent distilled off and the product neutralised with dilute aqueous sodium hydroxide. The piperidyl siloxane was isolated by ether extraction and purified by distillation.

5 parts of the product so obtained were mixed with 150 parts of octamethylcyclotetrasiloxane and 0.75 part of potassium hydroxide dissolved in 0.75 part of water added thereto. The mixture was heated with stirring at 160–180° C. for 6 hours, after which it was cooled to 130° C. 1.5 parts of sodium carbonate were then added and the mixture stirred at 130° C. for 30 minutes after which it was cooled and filtered to give 137 parts of a clear oil. This was a linear dimethylpolysiloxane end-stopped by piperidyl ethyl groups.

110 parts of this polysiloxane were dissolved in 200 parts of benzene and 1.9 parts of cyanuric chloride dissolved in 30 parts of benzene added thereto. 1 part of ammonium carbonate was then added and the mixture stirred at 20° C. for 3 hours. The mixture was then filtered and the solvent removed by distillation to give 108 parts of the triazinyl polysiloxane in the form of a yellow oil.

A piece of cotton gaberdine was passed through a 0.5 percent aqueous solution of sodium carbonate, excess solution removed by passing the treated fabric through rollers and the fabric dried at 120° C. for 5 minutes. The fabric was then passed through a 3 percent solution of the triazinyl polysiloxane in toluene after which the excess polysiloxane solution was removed by passing the treated fabric between squeeze rollers and the fabric dried at 120° C. for 5 minutes followed by baking at 150° C. for 5 minutes. The so treated fabric had a spray rating of 90–100 and when washed the water repellency was still retained after 5 washes.

What we claim is:

1. An organosilicon composition selected from a silane, the hydrolysis products thereof, disiloxane and equilibration products thereof having the formula:

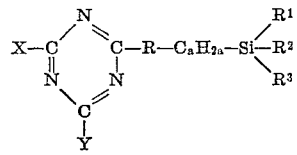

where R is selected from piperidyl and substituted piperidyl, pyridyl and substituted pyridyl, pyrrolyl, pyrrolinyl, pyrrolidinyl, 1,2,3,4-tetrahydroquinolyl, and 1,2,3,4-tetrahydroisoquinolyl, and $R^1$, $R^2$ and $R^3$, which may be the same or different, are selected from lower alkyl and substituted lower alkyl, carbocyclic aryl, and substituted carbocyclic aryl, alkaryl, alkenyl, hydroxy, hydrolysable groups, halogens and triorganosilylorganosiloxyanyl, X and Y which may be the same or different are selected from Cl, Br, I, OR' where R' is hydrogen, a lower alkyl and carbocyclic aryl and $a$ is a positive integer not greater than 15.

2. A composition according to claim 1 wherein $a$ has a value of from 1 to 6.

3. A composition according to claim 1 wherein the $R^1$, $R^2$ and $R^3$ are selected from methyl, ethyl, chloromethyl, methoxyethyl, phenyl, tolyl, chlorophenyl, vinyl, allyl, benzyl, methoxy, ethoxy, methoxyethoxy, allyloxy or phenoxy groups.

4. A composition according to claim 1 wherein R is piperidyl.

5. A composition according to claim 1 wherein R is is alkyl-piperidyl.

6. An organosilicon composition selected from a silane, the hydrolysis products thereof, disiloxane and equilibration products thereof and having the formula:

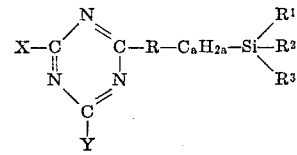

where R is selected from pyridyl, piperidyl and lower alkyl substituted pyridyl and piperidyl groups, $R^1$ and $R^2$, which may be the same or different, are selected from lower alkyl, carbocyclic aryl, and triorganosilylorganosiloxanyl groups, $R^3$ is selected from lower alkyl and carbocyclic aryl group, X and Y, which may be the same or different are selected from Cl, Br, I and OR' where R' is hydrogen, a lower alkyl group and $a$ is a positive integer not greater than 15.

References Cited
UNITED STATES PATENTS 3,238,205 3/1966 Watt _____ 260—249.5

WALTER A. MODANCE, *Primary Examiner.*

JOHN M. FORD, *Assistant Examiner.*